United States Patent Office 3,378,765
Patented Apr. 16, 1968

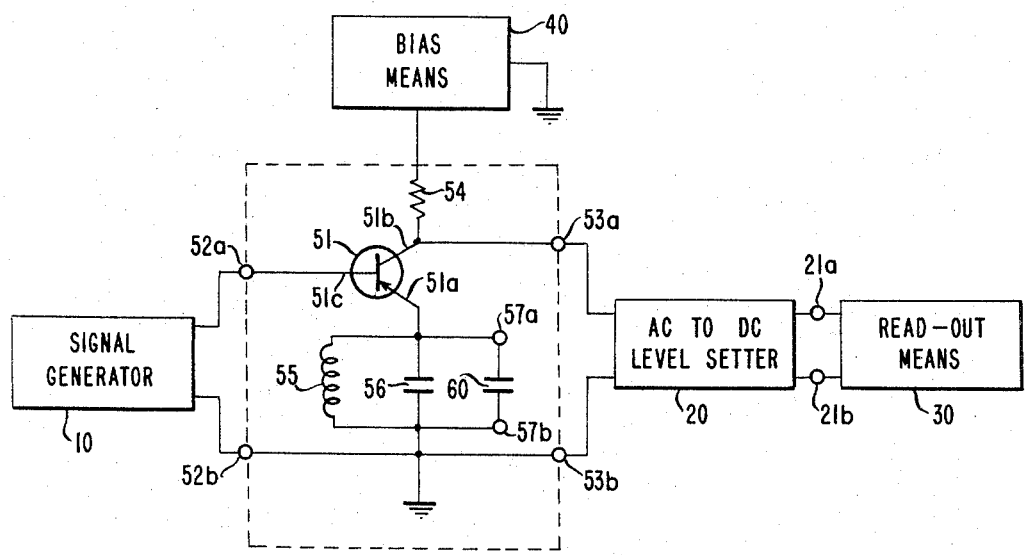

3,378,765
DEVICE FOR THE DIRECT MEASUREMENT OF CAPACITANCE
Manfred Hilsenrath, Los Gatos, Calif., and Terence J. McGurn, East Orange, N.J., assignors to International Business Machines Corporation, New York, N.Y., a corporation of New York
Filed Jan. 6, 1964, Ser. No. 335,935
8 Claims. (Cl. 324—60)

ABSTRACT OF THE DISCLOSURE

An apparatus for the direct measurement of capacitance of an unknown capacitor. A constant signal is applied to the input of a transistor circuit which includes the parallel combination of an inductor and a capacitor. By utilizing a voltage readout means connected across the output of said circuit, the capacitance of an unknown capacitor introduced across said combination can be read directly on said readout means.

---

This invention relates to capacitance measurement devices, and more particularly relates to a device permitting the direct measurement of capacitance by producing a voltage signal proportional to the capacitance under measurement.

Capacitance measuring circuits are known but heretofore they have operated not by measuring capacitance directly, but by measuring charge or current associated with a capacitive element and deducing capacitance therefrom. Such indirect measurement of capacitance entails several well known deficiencies. Primary among these is the unavoidable effect of internal impedance of the measuring device. Accuracy in such indirect capacitance measuring devices has been impedance dependent, and this has resulted in use of low internal impedance current sensing means, such as the Galvanometer movement. However, these movements themselves, while minimizing but not removing the impedance error, have inherent and well known readout deficiencies.

What has been needed is a measuring device that would directly measure the capacitance of a test element, rather than the current or charge involved in charging or discharging it. Thus the impedance error problem would be solved. Additionally the ideal device should produce a voltage proportional to the capacitance of the test element, so that advantageous high impedance readout means, such as a digital voltmeter, can be employed. Employment of such voltage readout means would allow multiplexing of a capacitance test of an element with other tests on the element, all of which could be readout on the same readout means. Also such a device would allow measurement of capacitance in two terminal networks having moderate dissipation factors.

Accordingly it is the principal object of the present invention to provide a device for the direct measurement of capacitance.

Another object is to provide such a device wherein a voltage signal is produced which is proportional to the measured capacitance.

Another object is to provide such a device wherein a readout may be had on a high impedance means such as a digital voltmeter.

Another object is to provide such a device wherein a capacitance measurement of an element may be multiplexed with other electrical measurements of the element and readout by the same means.

Yet another object is to provide such a device wherein measurement may be made on capacitive two terminal networks having moderate dissipation factors.

The foregoing and other objects, features and advantages of the invention will be apparent from the following more particular description of a preferred embodiment of the invention, as illustrated in the accompanying drawing.

In the drawing:

The figure is a circuit diagram of one embodiment of a device according to the invention, shown partially in block form and partially in schematic form.

Briefly, the device according to the invention contemplates a measuring circuit wherein a translating device having a control electrode terminal and at least two other electrode terminals such as a transistor is connected so that the control electrode and a first of said other electrodes form an input circuit while the first and a second of said other electrodes form an output circuit. The first electrode, being common to both input and output circuits, is arranged to include in its circuit a test element having capacitance in parallel with both a known capacitance and a known inductance. It is a characteristic of the arrangement that when a constant input signal is applied to the input circuit, as for example, from a signal generator, the change in the output voltage taken across the first and second electrodes is proportional to the capacitance introduced into the circuit with the test element. This proportionality is achieved by employing very high values of said known inductance and known capacitance. The output voltage across the first and second electrodes may, for example, be fed to an AC to DC level setter, after which the DC output will operate, for example, a digital voltmeter which has been calibrated to read the change in DC voltage directly as the capacitance to which it is proportional.

More specifically and with reference to the drawing, the illustrated embodiment of the measuring circuit 50 comprises a translating device consisting of a PNP transistor 51 having a first electrode in emitter 51a, a second electrode in collector 51b, and a control electrode in base 51c. The transistor is connected in the common emitter configuration, that is, with emitter 51a common to both the input and output circuits, specifically to input terminal 52b and output terminal 53b, where it is grounded. Base 51c is connected to the other input terminal 52a, and collector 51b is connected to load resistor 54 and the other output terminal 53a. Bias is applied to transistor 51 at load resistor 54 by bias means 40, which may be a battery or an appropriate biasing network. With appropriate biasing reversal, a NPN transistor may be substituted for the illustrated PNP transistor 51. It will be recognized that as so far described, this illustrative embodiment of measuring circuit 50 constitutes a standard common emitter configuration. As will be pointed out hereinbelow, other arrangemetns employing a translating device consisting of a transistor or the like may be used instead of the specific grounded common emitter arrangement of transistor 51 illustrated in the drawing.

Elements appearing in the emitter 51a circuit will be described hereinbelow, but for best understanding the means associated externally with measuring circuit 50 shall first be described. Signal generator 10 is attached to input terminal 52a, 52b of measuring circuit 50. The generator 10 may be any appropriate means known to the art and adapted to produce a sinusoidal or other regular alternating signal suitable in electrical values and frequency to test the given capacitance under measurement with the illustrative common emitter measuring circuit 50. The signal generator 10 must be capable of maintaining a constant frequency and output voltage to terminals 52a, 52b for at least as long a time as is required to measure the capacitance of the element under measurement.

Connected to terminals 53a, 53b, is an AC to DC level setter 20. Such devices are well known to the art, and for present purposes it is sufficient to note that device 20 functions to present a DC output voltage proportional to the AC input voltage impressed upon it. Since an AC voltage is developed across terminals 53a, 53b when AC signal generator 10 is connected across input terminals 52a, 52b, level setter 20 produces a DC voltage at terminals 21a, 21b in response to, and proportional to, the AC voltage at terminals 53a, 53b.

Connected to level setter 20 at terminals 21a, 21b is readout means 30. Advantageously, means 30 comprises a digital voltmeter of any appropriate form known to the art. Means 30 will read the voltage appearing across terminals 21a, 21b of level setter 20.

Returning now to the illustrative embodiment of measuring circuit 50, the emitter 51a circuit includes, in parallel, a choke 55, a capacitor 56, and measuring terminals 57a, 57b. Across terminals 57a, 57b may be inserted a two terminal element having a capacitance which is to be tested or measured by the measuring circuit 50. In the illustrative embodiment, this two terminal element is shown as capacitor 60. However, it should be recognized that other possible two terminal test elements or networks having a capacitance are intended to be represented by the test capacitor 60.

The values of choke 55 and capacitor 56 are arranged to effect proportionality between the capacitance of element 60 and the output voltage appearing at terminals 53a, 53b. That this may be done, and that the illustrated circuit does directly measure the capacitance of element 60 is established by the following mathematical analysis. The symbols to be employed are defined as follows:

$V_{in}$: AC input signal across 52a, 52b;
$V_e$: AC emitter 51a to ground voltage;
$V_{out}$: AC output signal across 53a, 53b;
$L_p$, $G_p$: choke 54 inductance and associated conductance;
$C_k$: capacitance of capacitor 56;
$C_x$, $G_x$: capacitance of test element 60 with its associated conductance;
$R_L$: total AC collector 51b load impedance, principally resistor 54;
$i_e$, $i_c$: AC emitter 51a and collector 51b current respectively;
$w$: angular frequency of signal at 52a, 52b;
$j$: square root of minus one;
$\alpha$: current gain factor.

When the input signal level voltage ($V_{in}$) is maintained constant by signal generator 10, the emitter to ground voltage ($V_e$) will also be essentially constant. The AC emitter current ($i_e$) may then be written as:

$$i_e = V_e\left[jw(C_x+C_k)+G_x+\frac{1}{jwL_p}+G_p\right]$$

It will be recognized that choke 54 in circuit 50 provides the DC path to ground of emitter 51a. This function is still provided no matter how large the inductance ($L_p$) of choke 54 is made. Consequently the inductance is chosen to be sufficiently large so that the term in the above expression containing it may be ignored compared to the other terms. Then, to obviate the effect of current passing by virtue of the test element conductance ($G_x$) and the choke conductance ($G_p$), the pure capacitor 56 is assigned a high enough value of capacitance ($C_k$) so that the choke conductance ($G_p$) and the test element conductance ($G_x$) may be ignored in the above expression compared to the capacitance terms ($C_x+C_k$).

When the conductance ($L_p$) of choke 55 and the capacitance ($C_k$) of capacitor 56 have been chosen to have sufficiently high values, the expression for the emitter current ($i_e$) will closely approach the following;

$$i_e = V_e jw[C_x+C_k]$$

which may be rewritten, $$i_e = V_e jwC_x + K_1$$

where $K_1$ is a constant equal to $V_e jwC_k$.

It is, of course, known that the collector current ($i_c$) is proportional to the emitter current ($i_e$), and thus:

$$i_c = \alpha i_e = \alpha V_e jwC_x + \alpha K_1$$

The output voltage across 53a, 53b may then be written:

$$V_{out} = i_c R_L = \alpha V_e jwC_x R_L + \alpha K_1 R_L$$

which may be rewritten, $$V_{out} = \alpha V_e jwC_x R_L + K_2$$

where $K_2$ is a constant equal to $K_1 R_L \alpha$.

Finally, differentiating with respect to $C_x$ gives:

$$\frac{d|V_{out}|}{d|C_x|} = \alpha V_e w R_L$$

which result means that if the circuit parameters shown on the right side of the equation are kept constant throughout the measurement, the change in AC voltage ($V_{out}$) appearing at terminals 53a, 53b upon introduction of test element 60 into the circuit is proportional to the capacitance ($C_x$) of test element 60. The change in DC output of level setter 20 at terminals 21a, 21b is proportional also therefore, to $C_x$ and consequently readout means 30 may be calibrated to read $C_x$ directly as reflected in the change in voltage appearing at terminals 21a, 21b.

In general then, in the illustrative common emitter transistor embodiment the values of the capacitor 56 and choke 55 are chosen so that the values of the $G_x$, $G_p$ and $$\frac{1}{jwL_p}$$

terms in the expression:

$$i_e = V_e\left[jw(C_x+C_k)+G_x+\frac{1}{jwL_p}+G_p\right]$$

are insignificant compared to the $jw(C_x+C_k)$ term. It will be recognized that similar considerations will dictate the order of magnitude of capacitor 56 and choke 55 when the other mentioned transistor or the like configurations are employed as translating device 51.

Thus the deviation of the reading of means 30 from the true capacitance of test element 60 which may be attributed to ignoring terms $G_x$, $G_p$ and $$\frac{1}{jwLp}$$

Percent nonproportionality error =

$$\frac{100\left(G_x+G_p+\frac{1}{jwL_p}\right)}{jw(C_x+C_k)+G_x+G_p\frac{1}{jwL_p}}$$

and it will be clear that any desired degree of proportionality approaching 100% may be obtained by appropriately adjusting $C_k$ and $L_p$ by selecting an appropriate choke 55 and capacitor 56.

It will be understood that transistor 51 may also be arranged in a common collector or common base configuration. In each of the three arrangements there is a control electrode, a first electrode common to both input and output circuits, and a second electrode. The test element 60 and the choke 55 and capacitor 56 always appear in the common first electrode circuit. Thus in the common collector circuit the elements 55, 56, 60 appear in the collector circuit, while in the common base circuit elements 55, 56, 60 appear in the base circuit. These circuits may be found, together with description thereof, in, for example, Electronic and Radio Engineering, by Terman, 4th edition, McGraw-Hill, New York, 1955, pages 733–803. When so arranged, these circuits will provide proportionality between the change in voltage appearing across the first and second electrode terminals 53a, 53b and the capacitance introduced by test element 60 the same as for the common emitter circuit already considered.

In operation the illustrative embodiment may be used as follows. A two terminal element 60 will be connected to test terminals 57a, 57b. It is a feature of the invention that element 60 may be a network having moderate dissipation losses, and the capacitance thereof will still be read by means 30. This follows, of course, directly from the above analysis where it was shown that the conductance ($G_x$) of the test element 60 may be ignored if appropriately high values of inductance ($G_p$) for choke 55 and capacitance ($C_k$) for capacitor 56 are chosen.

An appropriate constant voltage constant frequency signal will be impressed upon terminals 52a, 52b of measuring circuit 50. Bias means 40 will energize transistor 51. The AC output voltage at terminals 53a, 53b will cause level setter 20 to produce a proportional DC voltage at terminals 21a, 21b, which will be read by digital voltmeter 30 which will have been calibrated to read said voltage as the capacitance of element 60 to which it is proportional. Clearly, when known nominal values of element 60 are being checked with the present invention, fixed values of choke 55 and capacitor 56 may be employed. However, when an element 60 having capacitance whose order of magnitude is not known is to be tested, it may be advantageous to employ a variable choke 55 and a variable capacitor 56, so that an optimum may be arrived at between the exclusion of error by the raising of the inductance of choke 55 and the capacitance of capacitor 56, and the appropriate operation of the overall measuring device.

It will be realized by those skilled in the art, that the present invention allows multiplexing of other tests on test element 60 together with the capacitance test. Which other tests are employed will depend of course, on what the nature of two terminal element 60 is; whether it is for example, a diode, or a two terminal network. While it is a feature of the invention that such multiplexed testing is made possible by the characteristics of operation of the invention, such multiplexed testing is not itself part of the present invention. Moreover, and again unlike prior art capacitance measuring devices, test element 60 may have moderate dissipation factors, as is illustrated by conductance $G_x$, without affecting the accuracy of the readout at means 30 to a significant degree.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for the direct measurement of the capacitance of a test element comprising a translating device having a control electrode and at least two other electrodes; signal input means communicating with a first of said other electrodes and said control electrode and adapted to develop a constant frequency constant voltage alternating signal thereinto; a parallel branch arrangement included in the circuit of said first electrode, said parallel branch arrangement including inductance means having a high reactance component in a first branch, capacitance means having a high reactance component in a second branch, and means in a third branch adapted to include said test element; and load means communicating with a second of said other electrodes and said first electrode and adapted to develop an output voltage therein, the change in said output voltage upon introduction of said test element into said third branch being essentially proportional to the capacitance of said test element and approaching perfect proportionality as the value of the reactance component in each of said inductance means and capacitance means is increased.

2. Apparatus for the direct measurement of the capacitance of a test element comprising a translating device having a control electrode and at least two other electrodes; signal input means communicating with a first of said other electrodes and said control electrode and adapted to develop a constant frequency constant voltage alternating signal thereinto; a parallel branch arrangement included in the circuit of said first electrode, said parallel branch arrangement including inductance means having a high reactance component in a first branch, capacitance means having a high reactance component in a second branch, and means in a third branch adapted to include said test element; load means communicating with a second of said other electrodes and said first electrode and adapted to develop an output voltage therein, the change in said output voltage upon introduction of said test element into said third branch being essentially proportional to the capacitance of said test element and approaching perfect proportionality as the value of the reactance component in each of said inductance means and capacitance means is increased; and voltage readout means communicating with said load means.

3. Apparatus for the direct measurement of the capacitance of a test element comprising a translating device having a control electrode and at least two other electrodes; signal input means communicating with a first of said other electrodes and said control electrode and adapted to develop a constant frequency constant voltage alternating signal thereinto; a parallel branch arrangement included in the circuit of said first electrode, said parallel branch arrangement including inductance means having a high reactance component in a first branch, capacitance means having a high reactance component in a second branch, and means in a third branch adapted to include said test element; load means communicating with a second of said other electrodes and said first electrode and adapted to develop an output voltage therein, the change in said output voltage upon introduction of said test element into said third branch being essentially proportional to the capacitance of said test element and approaching perfect proportionality as the value of the reactance component in each of said inductance means and capacitance means is increased; AC to DC level setting means communicating with said load means; and voltage readout means connected to said level setting means.

4. Apparatus for the direct measurement of the capacitance of a test element comprising a translating device having a control electrode and at least two other electrodes; signal input means communicating with a first of said other electrodes and said control electrode and adapted to develop a constant frequency constant voltage alternating signal thereinto; a parallel branch arrangement included in the circuit of said first electrode, said parallel branch arrangement including inductance means having a high reactance component in a first branch, capacitance means having a high reactance component in a second branch, and means in a third branch adapted to include said test element; load means communicating with a second of said other electrodes and said first electrode and adapted to develop an output voltage therein, the change in said output voltage upon introduction of said test element into said third branch being essentially proportional to the capacitance of said test element and approaching perfect proportionality as the value of the reactance component in each of said inductance means and capacitance means is increased; AC to DC level setting means communicating with said load means; and a digital voltmeter connected to said level setting means.

5. Apparatus for the direct measurement of the capacitance of a test element comprising a transistor having a control electrode and at least two other electrodes; signal input means communicating with a first of said other electrodes and said control electrode and adapted to develop a constant frequency constant voltage alternating signal thereinto; a parallel branch arrangement included in the circuit of said first electrode, said parallel branch arrangement including inductance means having a high reactance component in a first branch, capacitance means having a high reactance component in a second branch, and means in a third branch adapted to include said test element; load means communicating with a second of said other electrodes and said first electrode and adapted to develop an output voltage therein, the change in said output voltage upon introduction of said test element into said third branch being essentially proportional to the capacitance of said test element and approaching perfect proportionality as the value of the reactance component in each of said inductance means and capacitance means is increased; and voltage readout means communicating with said load means.

6. Apparatus for the direct measurement of the capacitance of a test element comprising a transistor connected in common emitter configuration; signal input means connected to the base and emitter of said transistor and adapted to apply a constant frequency constant voltage alternating signal thereto; a parallel branch arrangement in the emitter circuit of said transistor and including inductance means having a high reactance component in a first branch, capacitance means having a high reactance component in a second branch, and means in a third branch adapted to include said test element; load means communicating with the collector and emitter of said transistor and adapted to develop an output voltage therein, the change in said output voltage upon introduction of said test element into said third branch being essentially proportional to the capacitance of said test element and approaching perfect proportionality as the value of the reactance component in each of said inductance means and capacitance means is increased; and voltage readout means communicating with said load means.

7. Apparatus for the direct measurement of the capacitance of a test element comprising a transistor connected in common emitter configuration; signal input means connected to the base and emitter of said transistor and adapted to apply a constant frequency constant voltage alternatnig signal thereto; a parallel branch arrangement in the emitter circuit of said transistor and including inductance means having a high reactance component in a first branch, capacitance means having a high reactance component in a second branch, and means a third branch adapted to include said test element; load means communicating with the collector and emitter of said transistor and adapted to develop an output voltage therein, the change in said output voltage upon introduction of said test element into said third branch being essentially proportional to the capacitance of said test element and approaching perfect proportionality as the value of the reactance component in each of said inductance means and capacitance means is increased; AC to DC level setting means communicating with said load means; and a digital voltmeter connected to said level setting means.

8. Apparatus for the direct measurement of the capacitance of a test element comprising a transistor connected in common emitter configuration; signal input means connected to the base and emitter of said transistor and adapted to apply a constant frequency constant voltage alternating signal thereto; a parallel branch arrangement in the emitter circuit of said transistor and including a choke in a first branch thereof, a capacitor in a second branch thereof, and means adapted to receive said test element into said third branch thereof; load means communicating with the collector and emitter of said transistor and adapted to develop an output voltage therein, the change in said output voltage upon introduction of said test element into said third branch being essentially proportional to the capacitance of said test element and approaching perfect proportionality as the values of the reactance of said choke and said capacitor are increased, the percentage deviation from perfect proportionality being given by the expression $$\frac{100\left(G_x + G_p + \frac{1}{jwL_p}\right)}{jw(C_x + C_k) + G_x + G_p + \frac{1}{jwL_p}}$$

and voltage readout means communicating with said load means.

References Cited
UNITED STATES PATENTS
| | | | |
|---|---|---|---|
| 3,160,824 | 12/1964 | Stair | 330—31 XR |
| 3,165,694 | 1/1965 | Young | 324—119 XR |

FOREIGN PATENTS
| | | |
|---|---|---|
| 947,918 | 8/1956 | Germany. |
| 859,593 | 1/1961 | Great Britain. |
| 925,852 | 5/1963 | Great Britain. |

OTHER REFERENCES
Radiotronics, "Transistor Fundamentals," TK 7800 R3, April 1959, vol. 24, No. 4, pp. 71–75.

RUDOLPH V. ROLINEC, *Primary Examiner.*

WALTER L. CARLSON, *Examiner.*

E. E. KUBASIEWICZ, *Assistant Examiner.*

UNITED STATES PATENT OFFICE

CERTIFICATE OF CORRECTION

Patent No. 3,378,765             April 16, 1968

Manfred Hilsenrath et al.

It is certified that error appears in the above identified patent and that said Letters Patent are hereby corrected as shown below:

Column 2, line 53, "arrangemetns" should read -- arrangements --. Column 4, line 35, "[jw" should read -- jw --; line 45, "$\frac{1}{jwLp}$" should read -- $\frac{1}{jwL_p}$ --; line 46, after "$\frac{1}{jwLp}$" insert -- in the above expression can be determined as follows: --. Column 7, line 43, after "means" insert -- in --.

Signed and sealed this 7th day of October 1969.

(SEAL)
Attest:

Edward M. Fletcher, Jr.            WILLIAM E. SCHUYLER, JR.
Attesting Officer                   Commissioner of Patents